UNITED STATES PATENT OFFICE.

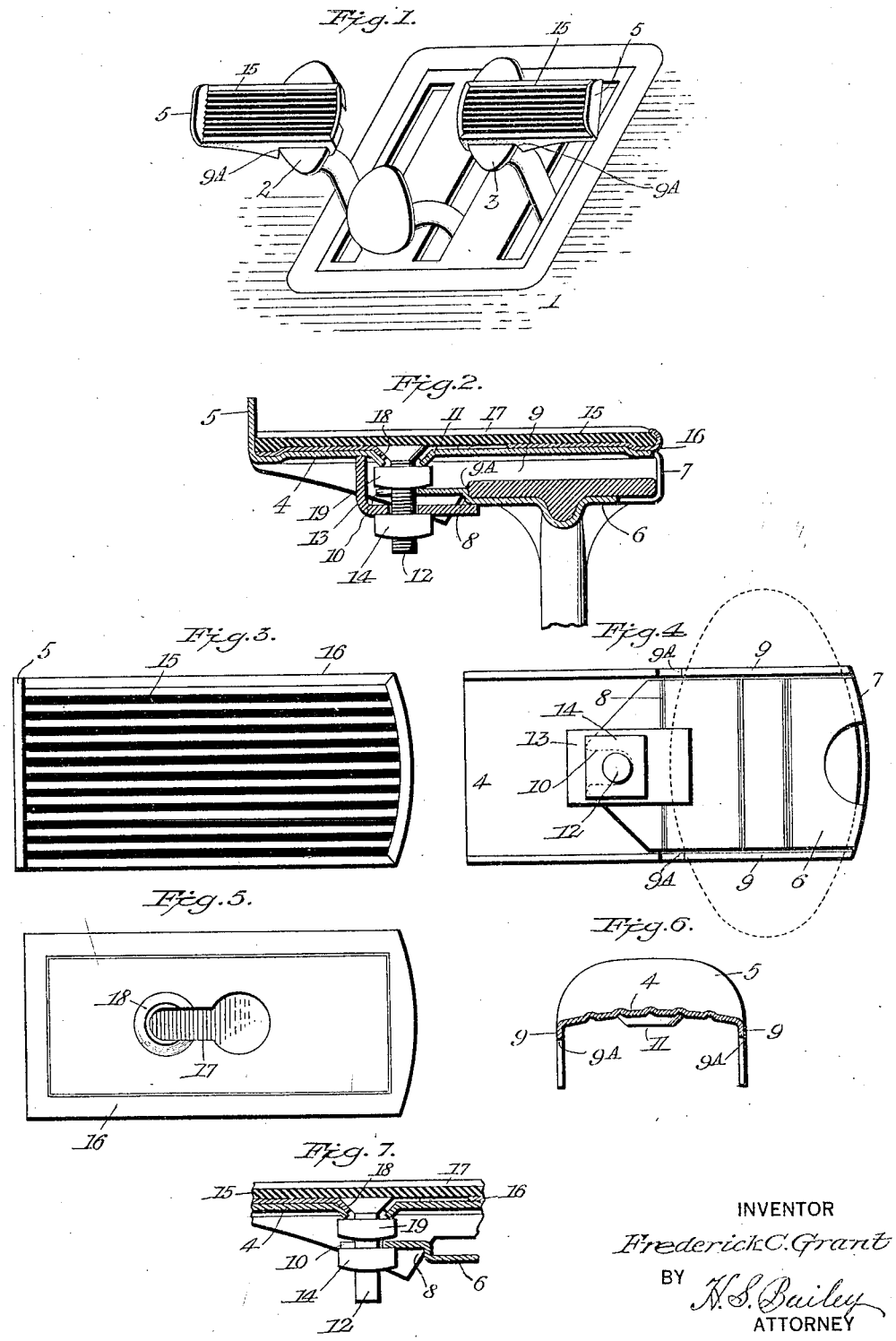

FREDERICK C. GRANT, OF DENVER, COLORADO.

PEDAL ATTACHMENT FOR AUTOMOBILES.

1,292,760.  Specification of Letters Patent.  Patented Jan. 28, 1919.

Application filed April 15, 1918. Serial No. 228,762.

*To all whom it may concern:*

Be it known that I, FREDERICK C. GRANT, a citizen of the United States of America, residing at the city and county of Denver and State of Colorado, have invented a new and useful Pedal Attachment for Automobiles, of which the following is a specification.

This invention relates to improvements in pedal attachments, and more particularly to attachments for the foot pedals of automobiles.

The object of this invention is to provide an attachment in the form of a lateral extension plate, which is adapted to be secured upon the clutch pedal and also upon the brake pedal of an automobile, thereby to provide ample foot support for the driver of the automobile, the said plates extending in opposite directions, and being provided with vertical ledges or stops on their outer ends which prevent the driver's feet from slipping over the ends of the plates, the said plates being provided with means for rigidly securing them to the said pedals.

Further, to provide a simple, foot-supporting attachment for automobile foot pedals of a style in common use, which can be easily and quickly applied and which cannot work out of the position in which they are attached.

These objects are accomplished by the device illustrated in the accompanying drawings, in which:

Figure 1, is a perspective view, showing the application of the improved pedal attachment.

Fig. 2, is a vertical, transverse sectional view through a pedal showing the improved foot suporting attachment secured thereto.

Fig. 3, is a top plan view of the attachment.

Fig. 4, is a bottom view of the attachment, the pedal being shown in dotted lines.

Fig. 5, is a bottom view of the pad and its holder.

Fig. 6, is a transverse sectional view through the attachment, the pad being removed. And Fig. 7, is a sectional view of a variation in the manner of clamping the attachment.

Similar letters of reference refer to similar parts throughout the several views.

Certain styles of automobiles in common use are provided with pedals for operating the clutch and brake, respectively, which are of such size and shape as to render their manipulation both troublesome and inconvenient.

The person driving a car always keeps one foot on the brake pedal and the other foot on the clutch pedal for immediate action, and these pedals in some cars are so small that the driver finds it a difficult matter to keep his feet on them, and more particularly when they are not provided with anything in the nature of a stop to keep the feet from a lateral sliding movement, and the liability of accident is greatly increased should either foot slip from its pedal at a critical moment. The present invention overcomes these objectionable features by providing an attachment which is quickly and easily applied to the pedals, which affords ample support for the feet, and which keeps the feet from slipping over the outer ends of the pedals.

Referring to the accompanying drawings:

The numeral 1 indicates the front floor portion of an automobile; 2, the clutch pedal; and 3, the brake pedal. These pedals illustrate a type of pedal in common use, which are provided with foot portions that are substantially elliptical in form and so relatively small as to provide inadequate support for feet of average size, and the improved attachment is adapted to be applied to this style of pedal, to provide adequate support for the feet of the driver of the car.

The improved pedal attachment comprises a metal plate 4, of suitable dimensions, one end of which terminates in an upright stop 5, the upper face of said plate being corrugated as shown, to prevent slipping of the foot of the driver, when the attachment is used without a pad.

The plate 4, is preferably stamped out of a steel plate, the corrugations being pressed in the plate, as shown in Fig. 6, and the plate is of greater length than is required for the foot support proper, and at a distance from the stop 5, corresponding to the desired length of the attachment, the plate is bent over at 7, to form a tongue 6, which is again bent at 8, the bends 7 and 8, forming abutments which engage the edges of the pedal, as clearly shown in Fig. 2. The horizontal portion of the tongue conforms to the contour of the under side of the pedal and the free end portion of this tongue extends beyond the adjacent edge of the pedal and is provided with a slot 10. The opposite side edges of the plate 4, are bent down at right angles, as shown at 9 and are formed with shoulders 9ᴬ, which act in conjunction with the abutment 7, to engage the opposite edges of the pedal, and prevent endwise movement of the attachment upon the pedal, as will be understood by reference to Figs. 1 and 4, the pedal being elliptical in contour. The shoulders 9ᴬ are formed by an increased width of the bent portions 9, at that point.

An axial hole 11, extends through the plate 4, and the plate is depressed around this hole to form a countersink to receive the head of a screw 12, which extends loosely through the hole 11, and through the slot 10, in the tongue 6. An L-shaped clamp 13, having a hole in its horizontal portion, is placed on the screw, with the free end of its horizontal portion overlapping the tongue 6 where it bends around the pedal at 8, and the end of its vertical portion bearing against the under side of the plate 4. A nut 14, is placed on the screw, and screwed down against the clamp 13, which clamps the tongue 6, against the pedal, and the attachment is thus held upon the pedal by the tongue, and against endwise movement by the abutments 7, and shoulders 9ᴬ.

As above described the pedal is used without the rubber foot pad 15, shown in connection therewith, the said pad when used, being arranged and secured upon the attachment in the following manner:

The pad 15, consists, preferably, of a corrugated rubber plate, which is secured to a retainer 16, in the form of a plate, the side and inner end edge portions of which are bent over and clamped upon the adjacent edge portions of the rubber, as clearly shown in Figs. 2 and 3, the outer end of the pad abutting against the stop 5 of the attachment.

The pad retainer 16, is provided with a keyhole slot 17, and concentric with the small end of this slot, the metal is depressed to form a countersink 18; this countersink portion being adapted to lie in the countersink formed in the plate 4, as shown in Fig. 2. The head of the screw 12, is passed through the enlarged end of the keyhole slot, and the screw is then slid to the opposite end of the slot so that its head rests in the countersink 18. The shank of the screw is then passed down through the hole in the plate 4, and the pad retainer 16, rests upon the said plate. The body of the plate 16, is inset from its edge portions to receive the corrugations in the plate 4, as shown in Figs. 2 and 5.

For convenience in handling the attachment before the same is secured upon a pedal, the pad is secured to the attachment, by screwing a nut 19, upon the screw 12, into engagement with the plate 4. The slotted end of the tongue 6, is adapted to rest on this nut, and should the clamp 13, be lost or misplaced, or should it be desired to dispense with it, the nut 14, can be screwed down against the slotted end of the tongue 6, and clamp the same against the nut 19, as shown in Fig. 7.

Having described my invention, what I claim as new and desire to secure by Letters Patent, is:

1. In a pedal attachment of the character described, a plate having an abutment on one end thereof, for engaging one edge of a pedal, coöperating abutments for engaging the other edge thereof, a tongue extending from the end abutment, and adapted to engage the under side of a pedal, a stop on the opposite end of said plate, and a clamping element supported in said plate and adapted to engage said tongue.

2. In a pedal attachment of the character described, a plate having a pedal engaging abutment on one end, a stop on its opposite end, and a clamping element spaced from said abutment and comprising a screw extending through said plate, a clamping member on said screw, a tongue extending from said abutment and adapted to engage the under side and opposite edge of a pedal, and engaged by said clamping member, and a nut on said screw for engaging said clamping member.

3. In a pedal attachment of the character described, a plate, having an abutment on one end for engaging one edge portion of a pedal, a foot engaging stop on the other end thereof, abutments on said plate for engaging the opposite edge portion of a pedal, a tongue extending from said abutment and adapted to engage the under side of a pedal, a screw extending through said plate, a clamping member on said screw which engages said tongue, and a nut on said screw for engaging said clamping member.

4. In a pedal attachment of the character described, the combination with a pedal, of a plate which is bent at right angles at one end to engage one edge portion of the pedal, abutments on said plate for engaging the opposite edge portion of the pedal, an integral tongue extending from the right angle bend and engaging the under side and opposite edge of said pedal, a screw extending down through and beyond said plate, a clamping member on said screw for overlapping the adjacent portion of said tongue, and a nut on said screw for engaging and clamping said clamping member against said tongue, said attachment having a foot engaging stop on the end thereof opposite its pedal engaging bend.

5. In a pedal attachment of the character described, the combination with a pedal, of a plate bent at one end to form an abutment to engage one edge of the pedal, coöperating abutments on said plate for engaging the opposite edge of the pedal, an integral tongue extending from the end abutment and engaging the under side of the pedal and means for clamping said tongue against said pedal, said attachment having a foot-engaging stop at one end.

6. In a pedal attachment of the character described, the combination with a pedal, of a plate having a foot-stop at one end, an abutment at the other end for engaging one edge of the pedal, coöperating abutments on said plate for engaging the other edge thereof, a tongue extending from the end abutment to engage the bottom of the pedal, a screw extending through the plate, and means carried by the screw to engage the adjacent portion of said tongue.

7. In a pedal attachment of the character described, the combination with a pedal, of a plate having a foot-stop at one end, an abutment at the other end for engaging one edge of the pedal, abutments on the plate for engaging the other edge of the pedal, a tongue extending from the end abutment and engaging the under side of the pedal, a retainer on the plate having a resilient foot pad, a screw extending through said retainer and plate, and means carried by the screw, for clamping the adjacent part of said tongue.

8. The combination with a pedal attachment having abutments for engaging the side edges of a pedal and a tongue for engaging the under side of a pedal, of a metal retainer on said attachment having a rubber foot pad, a screw extending through said retainer and attachment and a nut on said screw in engagement with said attachment for holding said retainer in place and clamping means also carried by said screw for engaging the adjacent portion of said tongue, said attachment having a foot-stop on one end thereof.

9. The combination with a pedal attachment having abutments for engaging the side edges of a pedal and a tongue for engaging the under side thereof, of a metal retainer on said attachment having a rubber foot pad, said retainer being provided with a keyhole slot, a screw which extends through the smaller end of said keyhole slot and through said attachment, a nut on said screw in engagement with said attachment for holding said retainer in place, and a clamping element also carried by said screw for engaging the adjacent portion of said tongue, said attachment having a foot-stop on one end therof.

10. The combination with a pedal attachment having abutments for engaging the side edges of a pedal and a tongue extending from one end for engaging the under side thereof, said attachment having an apertured countersink, of a metal retainer having a rubber foot pad and provided with a keyhole slot the smaller end of which is depressed concentrically to form a countersink, which is adapted to nest in the countersink of the attachment, a screw which is passed through the slot in the retainer and through the hole in the attachment, its head resting in the countersink in said retainer, a nut on said screw in engagement with the attachment for holding the retainer in place, and a clamping element also carried by said screw for engaging the adjacent portion of said tongue.

In testimony whereof I affix my signature in presence of two witnesses.

FREDERICK C. GRANT.

Witnesses:
G. SARGENT ELLIOTT,
ELIZABETH SMITH.

Copies of this patent may be obtained for five cents each, by addressing the "Commissioner of Patents, Washington, D. C."